March 13, 1945. O. STEINER 2,371,479
FLASHLAMP SUPPORTING AND EJECTING MEANS
Original Filed July 19, 1940 3 Sheets-Sheet 1
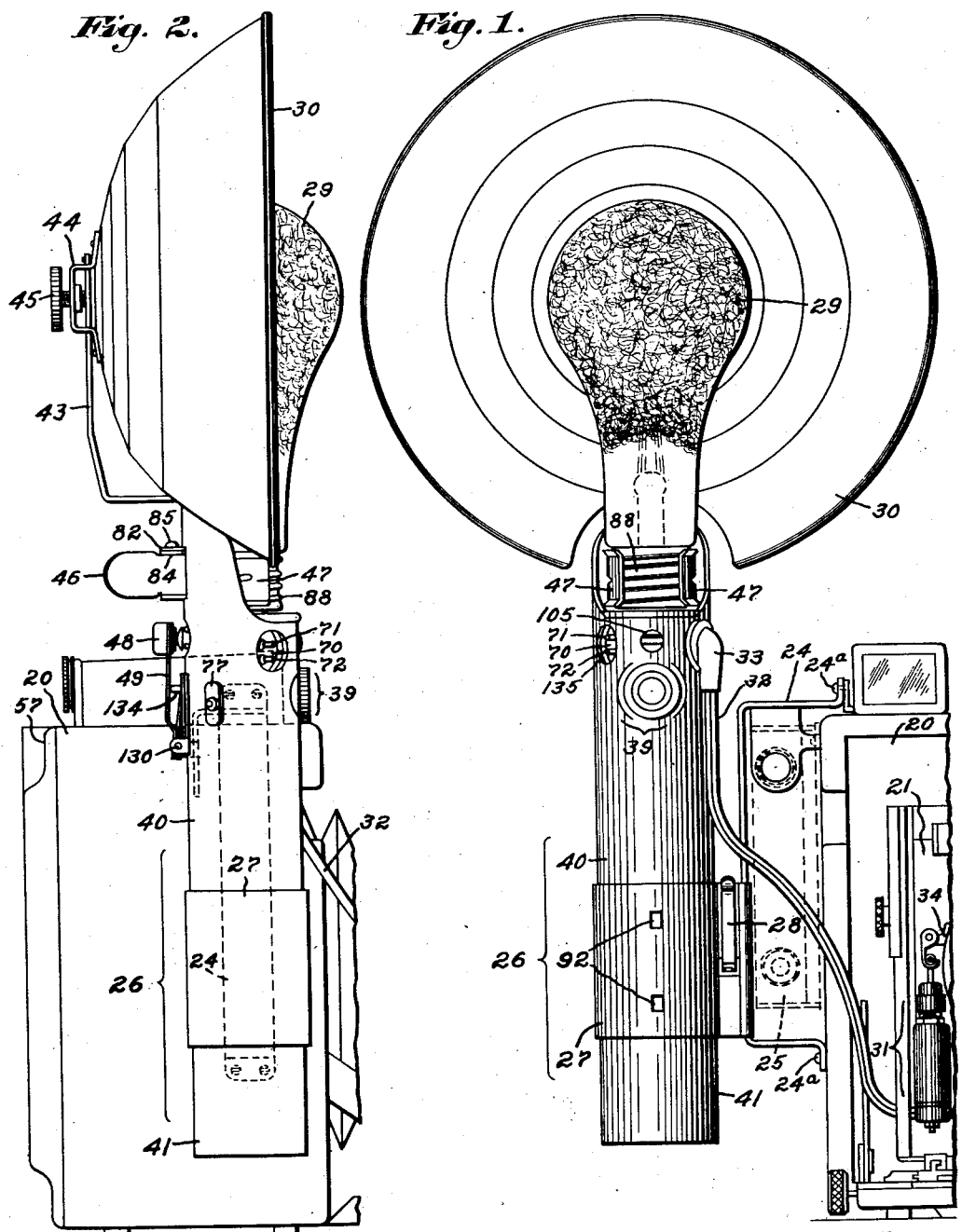
Inventor:
Oscar Steiner,
By Emery, Booth, Townsend, Miller and Landis
Attys.

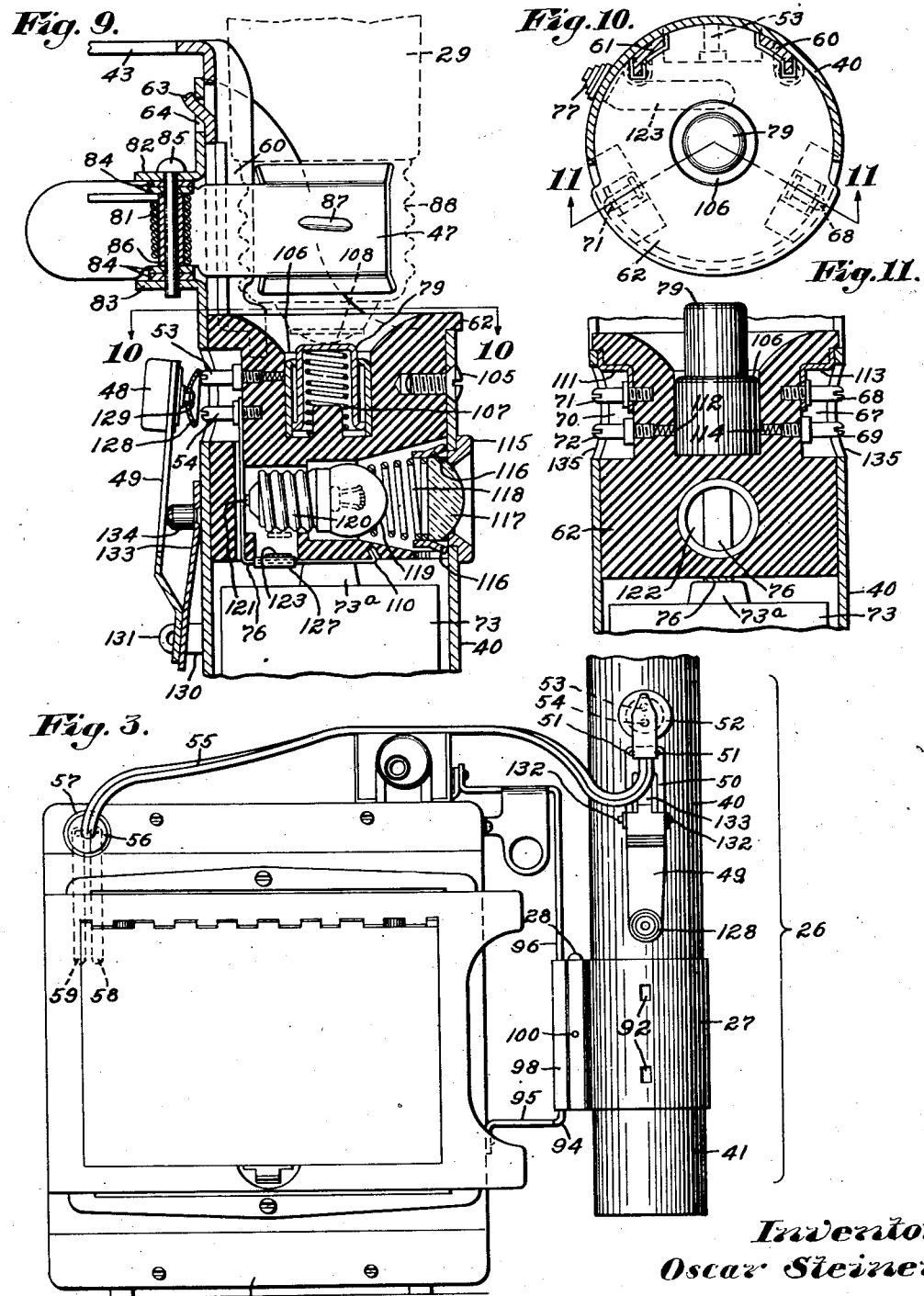

March 13, 1945.     O. STEINER     2,371,479
FLASHLAMP SUPPORTING AND EJECTING MEANS
Original Filed July 19, 1940     3 Sheets—Sheet 3
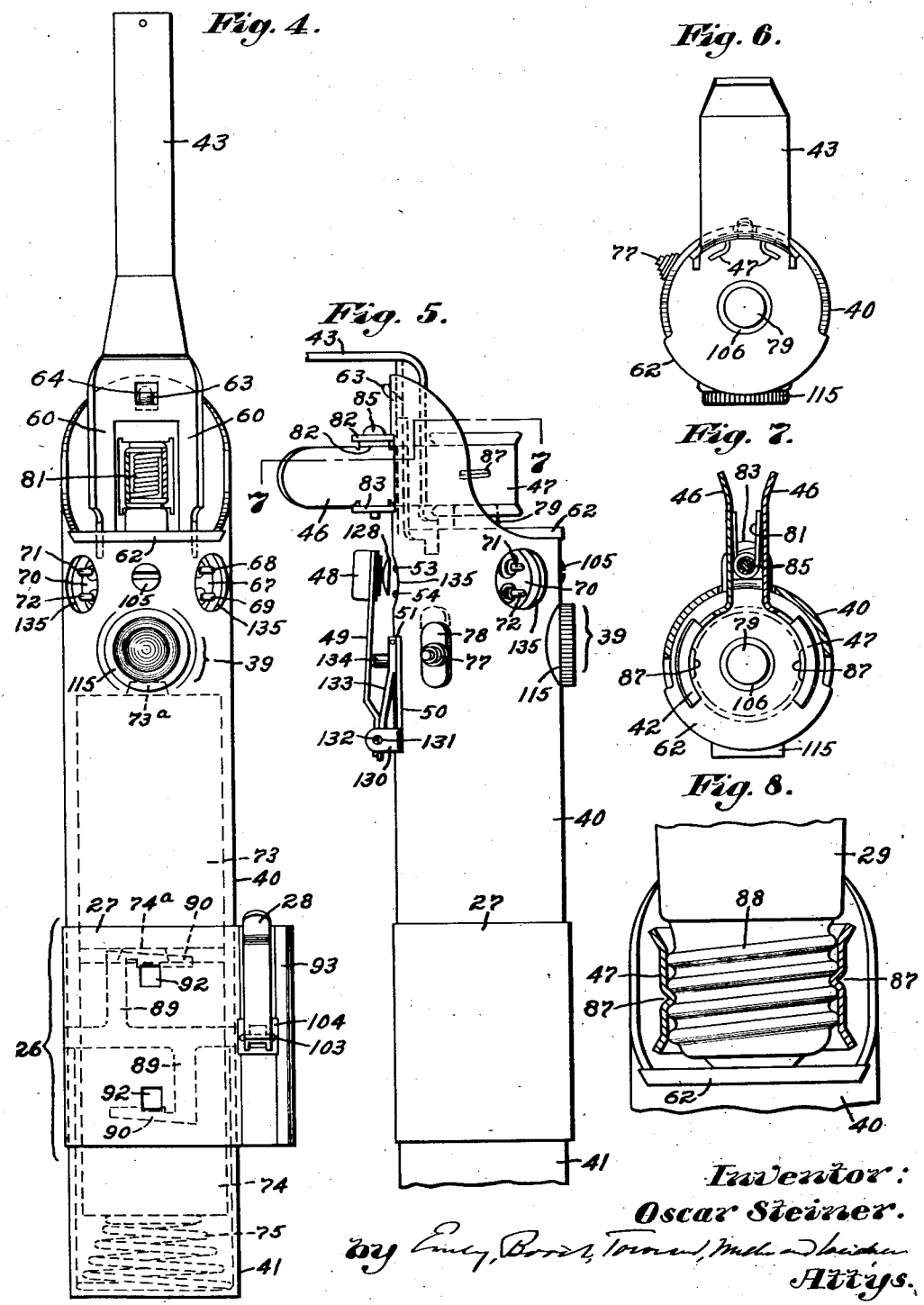
Inventor:
Oscar Steiner.

Patented Mar. 13, 1945

2,371,479

UNITED STATES PATENT OFFICE 2,371,479

FLASH LAMP SUPPORTING AND EJECTING MEANS

Oscar Steiner, Rochester, N. Y., assignor to The Folmer Graflex Corporation, Rochester, N. Y., a corporation of Delaware Original application July 19, 1940, Serial No. 346,395. Divided and this application July 1, 1943, Serial No. 493,098

19 Claims. (Cl. 67—31)

This application is a true division of my co-pending parent application Ser. No. 346,395, filed July 19, 1940, for Photographic flash synchronization equipment, now Patent No. 2,329,011, dated Sept. 7, 1943, and the claims hereof are directed solely to and cover only the flashlamp bulb, combined supporting and used, hot, bulb ejecting means disclosed in said parent application and the immediately associated parts therein disclosed, constituting in effect a part of such combined supporting and ejecting means, and therefore constituting details of the flashlamp socket structure, which combined means and immediately associated parts, while of general application, are particularly applicable to photography, as is fully set forth in such parent application. No claim is herein made to any combination that exists or may exist between (1) the herein disclosed flash bulb, combined supporting and used, hot, bulb ejecting means and immediately associated parts pertaining to the flashlamp socket structure, on the one hand, and (2) the flash synchronizer equipment for a camera disclosed in said parent application, on the other hand. Conversely, no claim is now made in said parent application to the flashlamp bulb, combined supporting and used, hot, bulb ejecting means, constituting details of the flashlamp socket structure, either per se or in combination.

The invention herein claimed relates therefore to flashlamp bulb, combined supporting and used hot bulb ejecting means and the immediately associated parts constituting in effect a part of the means pertaining to the details of the flashlamp socket structure, which invention, while of general application, is particularly adapted for use in photography, and more particularly in connection with flash synchronizing means or flash synchronizer equipment for controlling the movements of the shutter or shutters of a photographic camera and the flashing of the flashlamp of such camera in the taking of pictures particularly in rapid succession.

In order that the principle of the invention herein claimed may be readily understood, I have disclosed a single embodiment thereof in the accompanying drawings, and have therein sufficiently represented one manner of use of my herein claimed invention, which manner of use I will describe, not for purposes of limitation of my herein claimed invention, but in order to make clear an important preferred use of my herein claimed invention.

In the drawings:

Fig. 1 is a front plan view partly broken away of a camera having attached thereto a synchronizer equipment, the battery case being attached to the left-hand side of the camera and the magnetic tripper to the lens board of the camera, the flashlamp supporting means of my invention being shown in part;

Fig. 2 is a side view of the camera and equipment partly broken away, showing the battery case on the camera box, there being a magnetic tripper on the lens board, the camera being open and the flashlamp bulb in place ready for operation;

Fig. 3 is a rear view in elevation partly broken away, showing the position of the battery case with respect to the camera and the electrical connecting cable in place for focal plane synchronization;

Fig. 4 is a front view in elevation of the battery case removed from the camera, showing the position of the reflector support bracket, the reflector being removed and the batteries being indicated in dotted lines;

Fig. 5 is a side view in elevation, showing the battery case, the operating switch, and the spring socket for holding the photoflash lamp;

Fig. 6 is a top plan view of Fig. 5, showing the position of the reflector bracket, with the flashbulb clamps broken away;

Fig. 7 is a top plan view, partialy in section, of Fig. 5, showing the structure of the photoflash lamp socket;

Fig. 8 is an enlarged vertical section through the photoflash lamp socket, showing the structure of the two clamping members;

Fig. 9 is a vertical section through Fig. 5 showing the structure of the contacting members, together with the auxiliary lamp and its optical system not herein claimed;

Fig. 10 is a transverse section through Fig. 9 on the line 10—10 thereof; and

Fig. 11 is a vertical section through Fig. 10 on the line 11—11 thereof.

Referring more particularly to the drawings, and merely to make clear the preferred application of the invention herein claimed, which relates particularly to means providing for rapidly ejecting a used photoflash lamp immediately after having been flashed and still so hot it cannot readily be handled—I will first make reference to such parts of the camera, its synchronizer equipment. etc. as will serve to provide a full understanding of the relation of my herein claimed invention with respect thereto.

The casing of the camera is indicated generally at 20, the camera indicated being the well known Graphic type of camera. Obviously the synchronizer equipment can be applied to any type of camera having the usual between-the-lens shutter or the usual focal plane shutter, or having both such shutters.

The camera is preferably provided with a detachable lens board 21 carrying a between-the-lens shutter having a lens. Attached to the camera casing 20 is a battery case bracket 24, the ends whereof are attached to the camera casing by screws and desirably extending sufficiently about the range finder 25 usually provided on such type of camera.

The battery case is indicated generally at 26 and is shown as made up of two parts clamped or otherwise removably secured together and supported by a clamp member or ring 27, itself secured to the battery bracket 24 by a clamping lever 28.

The battery case 26 is so constructed as hereinafter described as to carry a flashlamp or bulb 29. A reflector 30 is also provided for the purpose of concentrating the light of said flashlamp or bulb upon the object to be photographed. The magnetic tripper or electromagnetic operator is indicated at 31, being preferably attached to the lens board 21 by suitable means. Such tripper is electrically connected to the battery case 26 by means of a cable 32 and plug 33, shown in Fig. 1. An operating or release lever 34, which may be of usual construction and which is provided upon the between-the-lens shutter, is operated by means fully disclosed in my parent application.

The battery case 26 is herein shown as made up of two preferably cylindrical sections 40, 41, the section 40 being the upper one and the section 41 being the lower one.

The camera having the synchronizer equipment attached thereto, has the reflector 30 supported by a reflector bracket 43 attached to the upper battery case section 40, which bracket serves to support said reflector in such position that the latter can be readily adjusted along (that is, lengthwise of) the said bracket 43. The reflector 30 is provided with a clamping bracket 44 and a clamp screw 45. When the latter is loosened, the reflector 30 can be adjusted up or down along the bracket 43, and thus can be set in proper position with respect to the flashlamp 29 which, in accordance with my invention, is held to the battery case 26 by means of a clamping socket having operating arms 46, 46 and jaws 47, 47 fully disclosed at a subsequent point in the specification. An operating button 48 (best shown in Figs. 2 and 9) is provided for completing the circuit through the flashlamp 29 and the magnetic tripper 31 when the front or between-the-lens shutter is provided. When, however, the synchronizer equipment is to be used in cooperation with the rear or focal plane shutter, which use is indicated in Fig. 3, I provide, in conjunction therewith, a structure which may be that shown in my Patent No. 2,188,065, dated January 23, 1940.

In the use of the synchronizer equipment herein illustrated, so as to make the application of my herein claimed invention entirely clear, the said operating button 48 (shown in Figs. 2 and 9) is carried by a flat spring member or arm 49 hinged to a bracket 50 (Fig. 3) attached to the upper battery case section 40 by means of rivets 51, 51, the parts being so constructed that the spring member or arm 49 can be turned downward so that the connecting plug 52 (Fig. 3) can engage the contacts 53, 54 (shown in dotted lines in Fig. 3). Said connecting plug 52 is provided with a cable 55 having a second plug 56 engaging a socket 57 of the focal plane shutter, which may be of the character disclosed in my said Patent No. 2,188,065.

The battery case 26 (but with the reflector removed) is shown in Fig. 4, which indicates how the reflector bracket 43 is attached to the battery case. The said bracket 43 is provided with two legs 60, 61 extending through holes in the battery case insulating block 62. The bracket 43 is provided with a hooked formation or member 63 which engages a hole 64 in the upper battery case section 40. In order to remove the bracket 43, it is merely necessary to apply downward pressure thereon to release the said reflector bracket.

As indicated in Fig. 4, the connecting plug 33 (shown in Fig. 1) has been removed from a socket 67 of the battery case, thereby exposing contact members 68, 69. A second socket 70 is provided on the left-hand side of said battery case as the same is viewed in Fig. 4, but the right-hand side viewing Fig. 5. Within said socket 70 are contact members 71, 72. In Fig. 4, the batteries 73, 74 are indicated in dotted lines. They have positive contact members 73a, 74a respectively, and the lower battery case section 41 is provided with a spring 75 for maintaining a contact to or with the negative side of the battery cell, said spring also serving to apply upward pressure on the battery cells 73, 74, causing contact to take place between the positive connection 73a (shown in dotted lines in Fig. 4) and the positive contact member 76 (shown in Fig. 9).

The auxiliary lamp, constituting no portion of the herein claimed invention, but referred to in some detail at a subsequent part of this specification for purposes of explanation, is provided with a control button indicated at 77 (Fig. 5), it desirably having an escutcheon plate 78. The said button 77 provides for the control of the electric circuit extending to the auxiliary lamp or bulb, indicated at 39 (Fig. 4).

Referring in detail to the structure to which my present invention pertains, there is provided, as indicated in Figs. 6, 7, 9, 10 and 11, a central lamp contact at 79 of novel construction. The said contact 79 has the additional important function of serving to eject the lamp bulb 29, when used and still hot, from the socket jaws 47, 47, through the releasing manipulation of the operator of the socket jaw fingers 46, 46.

As most clearly shown in Figs. 5, 7 and 9, wherein the socket jaw fingers are shown in elevation and in section, there is provided a hinge pin 85, a clamp spring 81 and two ears or members 82, 82, which are bent outwardly from the substance of the upper part of the battery case section 40, forming a support for the socket jaw arms or clamp members 46, 46. The said jaw fingers have bent-in members 84, 84, and the hinge pin, indicated at 85, passes through a hole provided in said members 82, 83, 84, 84, thus providing a hinge for the said socket jaw arms or clamp members 46, 46. A suitable spacing sleeve 86 is provided for supporting the coiled clamp spring 81. The socket jaws 47, 47 are provided with indentations 87, 87 to engage the convolutions of the thread 88 of the lamp base (best shown in Fig. 8).

As indicated in dotted lines in Fig. 4, the upper battery case section 40 and the lower section 41 are provided with vertical or lengthwise slots 87, 89 and horizontal or transverse slots 90, and each slot 90 is so shaped as to provide a projection and the battery case clamp member or ring 27 is provided with hook-engaging formations 92, 92 to engage said slots 90.

The internal construction of the upper part of the upper battery case section 40 is clearly shown in the cross sectional views 9, 10 and 11. Therein is shown a molded insulating cylindrical member or block 62 of suitable material, fitted into the battery case section 40 and held in place by a screw 105 (Fig. 9). Such molded member or block 62 carries the central contact 79, previously referred to, which is thimble-shaped and is fitted into a conducting sleeve 106 having a cupped-in upper end provided with a hole for the necessary lengthwise movement of said contact member 79, the lower end of which latter is outwardly flanged as shown in Fig. 9. Said molded member or block 62 has a small central projecting cylindrical formation within said contact member 79, over which formation is fitted a coiled spring 107 that causes said contact member 79 to be pushed upward so as to engage with the contact 108 of the flashlamp bulb 29. The coacting end flanges on the sleeve 106 and the contacts 79 prevent the spring 107 from pushing said contact member 79 beyond a certain limit. Said spring 107 is of sufficient strength to eject the flashlamp bulb 29, when used, from the socket jaws 47, 47, when said jaws are released by the application of pressure on the socket jaw arms or clamp members 46, 46 (best shown in Figs. 2, 5, 7 and 9).

The connector 53 is threaded into the molded member or block 62 against the pressure of a spring 109 (Fig. 9) which makes contact with conducting sleeve 106. The contact member 54 is also threaded into the insulating member or block 62 and through a hole (not shown) provided in the positive contact strip 76, as shown in Fig. 9, the lower end of which strip 76 has a turned-over end 110 anchored into said contact member or block 62. The contact member 71 is, as shown in Fig. 11, threaded into the molded member or block 62 and through a hole in the contact strip 111, thus connecting said contact member 71 with the upper battery case section 40. The contact member 72 is threaded into the said member of block 62 and causes a spring 112, seated in the socket at the inner end thereof, to insure contact between the contact member 72 and the conducting sleeve 106. As shown in Fig. 11, the contact member 68 is threaded into the said member or block 62 and through the connector strip 113, which also makes contact with the upper battery case section 40, thus completing a circuit between such section 40 and the connector member 68. The contact member 69 is threaded into the said block 62 against the pressure of a coiled spring 114 similar to the spring 112, so that contact is made with the conducting sleeve 106, thus completing the circuit between the said conducting sleeve 106 and the contact member 69.

While constituting no part of the invention herein claimed, I will for purposes of explanation make detailed reference to the auxiliary lamp 39 indicated generally in Figs. 1 and 2. It is shown in detail in Fig. 9 as including a short sleeve or cylindrical member 115 fitted into an opening in the upper battery case section 40, being held in such position by projecting lugs 116, 116. Said upper section 40 has a cylindrical hole with keyway openings permitting the passage of lugs 116, 116, whereupon said sleeve 115 is given a slight turn so that said lugs engage the wall of the said upper section 40, thus holding the sleeve 115 in place. Fitted into said sleeve is a lens 117 held in place by means of a spring 118 pressing against the bulb 119 of the auxiliary lamp 39 that is provided with the usual base 120. The said lens 117, spring 118, bulb 119 and base 120 are received in a cavity molded into the insulating block 62, so as properly to fit therein and be held in proper alignment. The bulb 119 is provided with a base contact 121 making contact with the positive connecting strip 76 (shown also in Fig. 11) in the lamp clearance hole 122.

The bulb 119 (auxiliary lamp 39) has a further important function in that it serves as means of checking the condition of the batteries 73 and 74. This is done by merely operating the switch button 77 and noting the color of the light filament. If the color is close to white, the batteries are satisfactory, but as the filament approaches a yellow color, the batteries are weak and should not be used.

The auxiliary lamp 39 not only is used in locating the object to be photographed, but it is used for adjusting the position or angle of the reflector 30, so that the reflector will throw the light in the proper direction for making the desired photograph.

As shown in Fig. 9, the auxiliary lamp button 77 has attached thereto a spring contact member by means of a shoulder rivet which slides in a slot in the upper battery case section 40.

In order to light the auxiliary lamp bulb 119, the button 77 is pushed upwardly, carrying with it the contact spring 123 which will be caused to contact with the lamp base 120, as shown in dotted lines in Fig. 9. Since the lamp contact 121 is in contact with the positive battery terminal 73a (shown in Figs. 9 and 10), current will flow through the auxiliary lamp bulb 119 back to the lamp base 120 through the contact finger 123, then to the upper battery case section 40, and finally through the battery spring 75 contacting with the negative side of the battery 74, thus completing the electric circuit to said auxiliary lamp bulb 119. This lamp circuit constituting auxiliary circuiting means that is independent from the photoflash lamp circuit and can be used at any time.

In order to complete the circuit through the photoflash lamp 29 and the batteries to the operating button 48 (shown in Fig. 9) which is insulated from the arm 49, there is attached a contact disk 128 by means of a rivet 129. As therein indicated, when button 48 is pressed, contact is made between contact member 53, disk 128 and connecting member 54, thus completing a circuit through the lamp contact 79, contact sleeve 106, spring 109, connector member 53, contact disk 128, connector member 54, and positive contact strip 76 to the battery contact 73a of the battery 73, and then through said battery to the contact 74a of battery 74, then through said battery to spring 75, to battery case sections 41 and 40, through battery socket members 47, flashlamp base 88 and lamp contact 108, thus completing a circuit through the photoflash lamp 29 and the batteries.

As best shown in Figs. 3, 5 and 9, the switch arm 49 and switch base 50, previously described as attached to the battery case section 40, are respectively provided with two upturned ears 130 extending from the base 50 and having holes 131, 131, and members 132, 132 on the switch arm 49, thereby providing a pivot for said switch arm. Also formed integral with the base plate 50 is a spring member 133 bearing against a flat portion of the switch arm 49 and tending to cause said switch arm to rock on the pivot formed by the members 132, 132 until contact with a stud 134 stops further movement of said switch arm 49. The construction and operation are such that the contact disk 128 does not normally touch connector members 53 and 54, but a slight pressure on the contact button 48 causes the switch arm 49 to spring sufficiently to cause the said disk 128 to contact with the said connector members 53 and 54.

The said switch arm 49 is so constructed that it can be swung downward away from the connector members 53 and 54, so that the focal-plane shutter connector 52 can be attached to the said connectors 53 and 54, thus putting the focal-plane shutter contacts 58, 59 in series with the photoflash lamp 29, and if contact is made between said contacts 58, 59 a circuit will be completed through contact plug 56, wire 55, connector 52 and contacts 53, 54, thus causing the flashlamp 29 to be ignited. When the magnetic tripper 31 is in use, the switch arm 49 overlies the contacts 53 and 54, thus preventing anyone from connecting any auxiliary device to those contacts, which, if done, would cause the flashlamp 29 to be flashed inadvertently. To permit the use of additional flashlamps remote from the battery case, there are provided the two additional sets of connectors 68, 69, 71, 72, which are in parallel with the photoflash lamp base by means previously described.

As shown in Figs. 9, 10 and 11, the connector members 53, 54, 68, 69, 71 and 72 are accessible through holes 135 in the upper battery case section 40. A lamp can be placed in the lamp socket jaws 47, 47, and additional lamp sockets can be connected to the contacts 68, 69, 71, 72, and upon the completion of a circuit through the connectors 53, 54, all three lamps will be caused to be ignited simultaneously.

Inasmuch as it forms no part of the herein claimed invention, it is unnecessary to refer in detail to the action of the magnetic tripper, but it is here stated that if a magnetic tripper is connected to either set of connectors 68, 69, or 71, 72, such magnetic tripper will also be in parallel with the photoflash lamp 29. By providing a magnetic tripper, it is possible to make photoflash exposures by any one of three well known methods, as referred to more fully in the specification of my parent application.

In order to provide a thorough understanding of the operation of the photoflash synchronization equipment in so far as the same is herein shown, the following explanation is given.

It will first be assumed that it is desired to make a so-called "open and shut" photoflash, meaning, as already stated, that the camera shutter is set on the "bulb" position and is in that position when the operating or shutter release lever 34 is pressed, the shutter being open and remaining open until the said lever 34 is pressed.

In making this type of exposure the battery case is placed on the camera as shown in Figs. 1 and 2. The plug 33 and the cable 32 are not in place, and there is no magnetic tripper attached to the shutter, it having been removed from the lens board, it being removably mounted therein by means of a suitable bracket. A flashlamp 29 is placed in the socket jaws 47, 47 and the auxiliary lamp contact 77 is pushed upwardly, thereby causing a beam of light to be projected in the direction of the object to be photographed. The clamp 28 is thrown downward and the battery case 26 is turned sufficiently in the member or ring 27 until the light from the auxiliary lamp 39 falls upon the object it is desired to photograph. The clamping lever 28 is then moved into the position shown in Fig. 1.

Assuming that the reflector 30 has been suitably adjusted in a vertical direction with respect to the flashlamp 29 so that the latter will center in the reflector, the most economical use of the light from said flashlamp is made in taking the photograph. After the suitable adjustment has been made, the contact button 79 is moved downwardly, thus extinguishing the auxiliary lamp bulb 119, and the operator then aligns his camera in any well known manner such as though the optical view finder. The shutter release or operating lever 34 is then depressed and at the same time the contact button 48 is pressed inwardly and then immediately both buttons are released. The pressure on the shutter release or operating lever 34 will have opened the shutter, and the pressure on the contact knob 48 will have caused the flashlamp 29 to become illuminated and the release of pressure on said release or opening lever 34 will have allowed the shutter to close. No further pressure will be required on the contact knob 48 since when the flashlamp 29 is ignited its circuit is opened.

When making a flash exposure with the use of the focal-plane shutter, the contact lever 49 is folded downwardly as indicated in Fig. 3, and the connector plug 52 is connected to contacts 53 and 54. The said plug 52 is attached to a cable 55 having on its opposite end a plug 56 engaged with the focal plane synchronizing socket 57 connected with the contacts 58 and 59 of the camera back. The flashlamp 29 is inserted in the socket members or jaws 47, 47 and the bulb 119 of the auxiliary lamp 39 is illuminated by manipulation of the switch 77 and the reflector 30 is properly aligned from the object to be photographed. The front shutter is set on "time" in the open condition and the back shutter is ready to make an exposure upon releasing the focal-plane shutter-release lever (not here shown). The structure of such focal-plane shutter and the synchronizing mechanism therefor are fully disclosed in my said Patent No. 2,188,065. When the shutter is released, the curtain travels downwardly and at a predetermined point, the contacts 58 and 59 are bridged or connected together by a metallic tab or element on the shutter curtain.

When it is desired to make a photoflash exposure using the front or between-the-lens shutter, a flashlamp 29 is inserted in the socket jaws 47, 47, and the connector plug 33 is connected to socket 67, thus connecting the magnetic tripper 31 to the electrical circuit of battery case 26. The said battery case is positioned in the manner previously described, so as to ensure the most efficient use of the light from the flashlamp 29. The focal-plane shutter is set in the "open" position. The between-the-lens shutter is set for whatever speed it is desired to use. The shutter is then cocked, the release or operating lever 34 having been previously connected to the magnetic tripper 31.

The release or operating lever 34 is now depressed part way, but not sufficiently far to trip the shutter. The contact bar 49 and the button 48 will be in the position shown in Fig. 2 and pressure on the button 48 will close the contacts 53 and 54. Current will then flow from batteries 73, 74 through positive contact strip 76, connector 54, contact disk 128, connector 53, contact spring 109, connector button 79, contact 108 through the filament of flashlamp 29, to the lamp base (shown in Fig. 8) and socket jaws 47, 47 and thence to ground, completing the circuit through the flashlamp. The connector 68 is also connected to ground and connector 69 is connected to spring 114, which contacts with the conducting sleeve 106 of the central lamp contact 79. Current flows through the magnetic tripper winding and through cable 32 and the rod or shaft of the magnetic tripper 31 will be caused to move downwardly. The release or operating lever 34 will then be moved downward, thus releasing the shutter, flashing the lamp 29 and causing an exposure to be made.

It will be very evident from the foregoing explanation of one manner of use or adaptation of the invention herein claimed that it is highly important to provide a photographic camera equipped with a photoflash lamp, with means whereby the used, hot bulbs may be very quickly ejected without touching the same with the hands. I am fully aware that it has been proposed to provide a lamp socket for flashlamps used in photography in which means are provided whereby the flashlamp bulb can be inserted into the socket without screwing the same therein and so that the hot, used bulb can be ejected from the socket without unscrewing the bulb or touching the same with the fingers. So far as I am aware, however, no one has heretofore provided means such as herein disclosed and claimed and by which the flashlamp bulb is held by clamping jaw or members constituting the sole means for holding the flashlamp bulb in place against a spring actuated contact, such as 79, provided in a battery case or the like, and from which battery case or the like the used, hot bulb is ejected by wholly axial movement imparted by the said lamp contact 79 when the clamping jaws or members are, by the fingers of the operator, released from their gripping or clamping engagement with the flashlamp bulb.

Having thus described one illustrative embodiment of the invention, it is to be understood that although specific terms are employed, they are used in a generic and descriptive sense and not for purposes of limitation, the scope of the invention being set forth in the following claims.

I claim:

1. In flashlamp, combined supporting and ejecting means for use particularly in photography, a battery case provided with electric circuiting means and adapted to receive battery means, said battery case having an insulating block, a movable central lamp contact part for the base of a flashlamp bulb, said contact part being supported for bulb-receiving and used-bulb ejecting movement in said insulating block and being connected to said electric circuiting means; a spring co-acting with said contact part and positioned to and acting to eject the used bulb by axial movement only of said bulb, when released from its supporting means; said spring having sufficient strength and being, when seated, under sufficient compression to eject the used bulb from its socket when said bulb is released from its supporting means, said battery case having a prolongation extending beyond said insulating block; a pair of spring-pressed, socket, clamp members pivotally mounted upon said prolongation in such position as to receive between them and support a flashlamp bulb, thereby to hold said bulb in functioning position upon said contact part; said clamp members, at one side of their said pivot, having jaws to receive the flashlamp bulb directly between them and having, at the other side of their said pivot, projections to be engaged and pressed upon by the fingers of the operator, thereby to open said jaws for releasing the bulb, so that the bulb, without preliminary turning or other movement by the force of the said spring co-acting with the contact part, is immediately ejected axially.

2. In flashlamp, combined supporting and ejecting means, a battery case for the flashlamp having electric circuiting means, said battery case having an insulating block, a lamp contact mounted in said insulating block for electrical engagement with the base of a flashlamp bulb and connected to said electric circuiting means, said lamp contact being movable in said insulating block for the purpose of ejecting a used, hot, flashlamp bulb, a spring positioned to move said lamp contact and thereby to eject such bulb when released, said spring having sufficient strength and being, when seated, under sufficient compression to eject the used bulb from its socket when said bulb is released from its supporting means, said battery case having a part extending beyond said insulating block, and bulb supporting and releasing means mounted upon said extending part to engage the flashlamp bulb and constituting the means to support the bulb upon said movable contact.

3. In flashlamp, combined supporting and ejecting means, a battery case for the flashlamp having electric circuiting means, said battery case having an insulating block, a lamp contact mounted in said insulating block for electrical engagement with the base of a flashlamp bulb and connected to said electric circuiting means, said lamp contact being movable in said insulating block for the purpose of ejecting a used, hot, flashlamp bulb, a spring positioned to move said lamp contact and thereby to eject such bulb when released, said spring having sufficient strentgh and being, when seated, under sufficient compression to eject the used bulb from its socket when said bulb is released from its supporting means, said battery case having a part extending beyond said insulating block, and bulb supporting and releasing means mounted upon said extending part to engage the flashlamp bulb and constituting the means to support the bulb upon said movable contact, said supporting and releasing means comprising manually-operable bulb-clamping means mounted on said extending part for opening and closing movement and positioned to engage directly with the base of the said bulb when closed, and so constituting the sole supporting means for the said bulb when in position to be flashed.

4. In flashlamp, combined supporting and ejecting means, a battery case for the flashlamp having electric circuiting means, said battery case having an insulating block, a lamp contact mounted in said insulating block for electrical engagement with the base of a flashlamp bulb and connected to said electric circuiting means, said lamp contact being movable in said insulating block for the purpose of ejecting a used, hot, flashlamp bulb by movement of the bulb wholly in an axial direction, thereby avoiding preliminary turning movement, a spring confined below said lamp contact and acting when the bulb is released to eject the same, said spring having sufficient strength and being, when seated, under sufficient compression to eject the used bulb from its socket when said bulb is released from its supporting means, said battery case having a part extending beyond said insulating block, and bulb supporting and releasing means mounted upon said extending part to engage the flashlamp bulb and constituting the means to support the bulb upon said movable contact.

5. In flashlamp, combined supporting and ejecting means, a battery case for the flashlamp having electric circuiting means, said battery case having an insulating block, a lamp contact mounted in said insulating block for electrical engagement with the base of a flashlamp bulb and connected to said electric circuiting means, said lamp contact being movable in said insulating block for the purpose of ejecting a used, hot, flashlamp bulb by movement of the bulb wholly in an axial direction, thereby avoiding preliminary turning movement, a spring confined below said lamp contact and acting when the bulb is released to eject the same, said spring having sufficient strength and being, when seated, under sufficient compression to eject the used bulb from its socket when said bulb is released from its supporting means, said battery case having a part extending beyond said insulating block, and bulb supporting and releasing means mounted upon said extending part to engage the flashlamp bulb and constituting the means to support the bulb upon said movable contact, said supporting and releasing means comprising manually operable bulb-clamping means mounted on said extending part for opening and closing movement and positioned to engage directly with the base of the said bulb when closed and so constituting the sole supporting means for the said bulb when in position to be flashed.

6. In flashlamp, combined supporting and ejecting means, a battery case for the flashlamp having electric circuiting means, said battery case having an insulating block, a lamp contact mounted in said insulating block for electrical engagement with the base of a flashlamp bulb and connected to said electric circuiting means, said lamp contact being movable in said insulating block for the purpose of ejecting a used, hot, flashlamp bulb, a spring positioned to move said lamp contact and thereby to eject such bulb when released, said spring having sufficient strength and being, when seated, under sufficient compression to eject the used bulb from its socket when said bulb is released from its supporting means, said battery case having a part extending beyond said insulating block, and bulb supporting and releasing means mounted upon said extending part to engage the flashlamp bulb and constituting the means to support the bulb upon said movable contact, said supporting and releasing means comprising manually-operable clamp members mounted on said extending part for pivotal opening and closing movements.

7. In flashlamp, combined supporting and ejecting means, a battery case for the flashlamp having electric circuiting means, said battery case having an insulating block, a lamp contact mounted in said insulating block for electrical engagement with the base of a flashlamp bulb and connected to said electric circuiting means, said lamp contact being movable in said insulating block for the purpose of ejecting a used, hot, flashlamp bulb, a spring positioned to move said lamp contact and thereby to eject such bulb when released, said spring having sufficient strength and being, when seated, under sufficient compression to eject the used bulb from its socket when said bulb is released from its supporting means, said battery case having a part extending beyond said insulating block, and bulb supporting and releasing means mounted upon said extending part to engage the flashlamp bulb and constituting the means to support the bulb upon said movable contact, said supporting and releasing means comprising a pair of spring-pressed clamp members pivotally mounted on said extending part and having, at one side of their pivot, clamping jaws to engage the base of the bulb and having projections, on the other side of their pivot, to be manually manipulated by the operator to release the bulb and to permit the said spring to eject the bulb by quick movement of the bulb in a direction wholly axial of itself.

8. In flashlamp, combined supporting and ejecting means, a battery case for the flashlamp having electric circuiting means, said battery case having an insulating block, a lamp contact mounted in said insulating block for electrical engagement with the base of a flashlamp bulb and connected to said electric circuiting means, said lamp contact being movable in said insulating block for the purpose of ejecting a used, hot, flashlamp bulb, a spring positioned to move said lamp contact and thereby to eject such bulb when released, said spring having sufficient strength and being, when seated, under sufficient compression to eject the used bulb from its socket when said bulb is released from its supporting means, said battery case having a part extending beyond said insulating block, and bulb supporting and releasing means mounted upon said extending part to engage the flashlamp bulb and constituting the means to support the bulb upon said movable contact, and a conducting part in which said contact part is movably mounted for bulb-ejecting movement, which conducting part is stationarily mounted in said insulating block, and which conducting part is in electrical connection with said circuiting means.

9. In flashlamp, combined supporting and ejecting means, a battery case for the flashlamp having electric circuiting means, said battery case having an insulating block, a lamp contact mounted in said insulating block for electrical engagement with the base of a flashlamp bulb and connected to said electric circuiting means, said lamp contact being movable in said insulating block for the purpose of ejecting a used, hot, flashlamp bulb, a spring positioned to move said lamp contact and thereby to eject such bulb when released, said spring having sufficient strength and being, when seated, under sufficient compression to eject the used bulb from its socket when said bulb is released from its supporting means, said battery case having a part extending beyond said insulating block, and bulb supporting and releasing means mounted upon said extending part to engage the flashlamp bulb and constituting the means to support the bulb upon said movable contact, said lamp contact being of thimble shape the said spring to eject the bulb being a coiled spring which is of sufficient strength and the coils thereof, when the spring is seated, being under sufficient compression in the axial direction of the coils to render the said spring a bulb ejecting spring to eject a heated bulb without necessary manual contact with said bulb, and a conducting sleeve-like part in which said lamp contact is mounted for its ejecting movement, said conducting part being in electrical connection with the circuiting means of the battery case.

10. In flashlamp, combined supporting and ejecting means, a battery case for the flashlamp having electric circuiting means, said battery case having an insulating block, a lamp contact mounted in said insulating block for electrical engagement with the base of a flashlamp bulb and connected to said electric circuiting means, said lamp contact being movable in said insulating block for the purpose of ejecting a used, hot, flashlamp bulb, a spring positioned to move said lamp contact and thereby to eject such bulb when released, said spring having sufficient strength and being, when seated, under sufficient compression to eject the used bulb from its socket when said bulb is released from its supporting means, said battery case having a part extending beyond said insulating block, and bulb supporting and releasing means mounted upon said extending part to engage the flashlamp bulb and constituting the means to support the bulb upon said movable contact, said supporting and releasing means including a pivotal pin mounted in the wall of said extending part lengthwise beyond and laterally outside of said insulating block, and a pair of bulb-clamping members pivoted upon said pin, and provided with spring means to cause said clamping member to engage the bulb and so to support said bulb upon said lamp contact, and which clamping members may be opened by manual manipulation without touching the bulb.

11. A structure in accordance with claim 10, but wherein the part of the battery case extending beyond said insulating block is provided with ears 82, 83 in which said pivotal pin is mounted.

12. A structure in accordance with claim 10, but wherein the part of the battery case extending beyond said insulating block is provided with ears 82, 83 in which said pivotal pin is mounted, and wherein the spring means for said clamping members consists of a spring 81 coiled about said pivotal pin.

13. A structure in accordance with claim 10, but wherein the part of the battery case extending beyond said insulating block is provided with ears 82, 83 in which said pivotal pin is mounted, and wherein said bulb-clamping members are socket jaws 47, 47 having formations 87, 87 to engage like formations upon the base of the photoflash lamp bulb.

14. A structure in accordance with claim 10, but wherein the part of the battery case extending beyond said insulating block is provided with ears 82, 83 in which said pivotal pin is mounted, and wherein said bulb-clamping members are socket jaws 47, 47 having indentations 87, 87 to engage a screw-like formation 86 upon the bulb-base.

15. In flashlamp, combined supporting and ejecting means for use particularly in photography, a battery case provided with electric circuiting means and having battery means and having means to support a flashlamp bulb; said battery case having an insulating block at its upper end and having a partial upward extension above the insulating block; a pair of spring-pressed, socket, clamp members directly mounted upon said partial extension for pivotal clamping movement against the bulb and adapted to receive and support the said bulb by such clamping movement; said insulating block having mounted therein, below said pivoted-socket clamping members, means for forcibly ejecting the used bulb of the photoflash lamp when released from the action of said clamp members.

16. Flashlamp, combined supporting and ejecting means in accordance with claim 15, but wherein upon said partial upward extension of the battery case there is provided as an axial support for said clamp members a pin extending in a direction lengthwise of said battery case, so that said clamp members thereon supported, are caused by such spring pressure to engage opposite sides of the bulb at the base thereof.

17. Flashlamp, combined supporting and ejecting means in accordance with claim 15, but wherein upon said partial upward extension of the battery case, there is supported a pin 85 extending in a direction lengthwise said battery means and which constitutes an axial support for both of said clamp members, and wherein a coiled spring 81 received upon said pin 85 constitutes the means for pressing said clamp members against the sides of the base of the flashlamp.

18. Bulb supporting and ejecting means for use in a flashlamp to be provided with a battery case with electric circuiting means, said bulb supporting and ejecting means having a lamp contact for electrical engagement with the base of a flashlamp bulb and adapted to be connected to such electric circuiting means, said lamp contact being a seated coil spring which is of sufficient strength and the coils whereof are under sufficient compression in an axial direction of the spring coil to render the said spring a bulb ejecting spring, the said bulb supporting means having bulb releasing means mounted upon an extending part so as to engage the flashlamp bulb and constituting the means to support the bulb upon said movable contact, whereby upon manual movement imparted to said releasing means and without manual handling of the bulb to be ejected, the bulb is ejected from the said bulb supporting means by the action of the said coil spring.

19. A construction in accordance with claim 18, but wherein the said coil spring is contained within a thimble-shaped lamp contact 79 which itself directly engages the seated bulb and which, when the said releasing means are manually acted upon to release the bulb, is forced axially outward by the action of the compressed coiled spring.

OSCAR STEINER.